United States Patent
Lin et al.

(10) Patent No.: US 6,650,696 B1
(45) Date of Patent: Nov. 18, 2003

(54) SYSTEM AND METHOD FOR COMMUNICATING DATA AMONG A PLURALITY OF DIGITAL SIGNAL PROCESSORS

(75) Inventors: Tien-Yi Lin, Fremont, CA (US); Steven Chow, San Carlos, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/465,234

(22) Filed: Dec. 15, 1999

(51) Int. Cl.[7] .................................................. H04L 5/22
(52) U.S. Cl. ............................... 375/219; 370/365
(58) Field of Search ................................. 375/219, 220; 370/359, 360, 365, 376, 465, 463, 466, 467, 263, 264, 271, 280, 294; 709/201, 218, 239; 712/225, 11, 18

(56) References Cited

U.S. PATENT DOCUMENTS

| | | | |
|---|---|---|---|
| 4,665,514 A | 5/1987 | Ching et al. | 370/60 |
| 4,771,425 A | 9/1988 | Baran et al. | 370/85 |
| 4,819,228 A | 4/1989 | Baran et al. | 370/85 |
| 4,903,261 A | 2/1990 | Baran et al. | 370/94.2 |
| 5,524,110 A | 6/1996 | Danneels et al. | 370/62 |
| 5,526,353 A | 6/1996 | Henley et al. | 370/60.1 |
| 5,768,613 A * | 6/1998 | Asghar | 712/35 |
| 5,778,244 A * | 7/1998 | Putnins et al. | 712/15 |
| 5,842,014 A * | 11/1998 | Brooks et al. | 709/103 |
| 5,953,509 A * | 9/1999 | Ciccarelli et al. | 710/100 |
| 6,198,558 B1 * | 3/2001 | Graves et al. | 359/137 |
| 6,266,342 B1 * | 7/2001 | Stacey et al. | 370/465 |

* cited by examiner

*Primary Examiner*—Chi Pham
*Assistant Examiner*—Khanhcong Tran
(74) *Attorney, Agent, or Firm*—Baker Botts L.L.P.

(57) ABSTRACT

A system for communicating data among digital signal processors (DSPs) includes DSPs and a shift register. Each DSP includes a transmit node that communicates data and a receive node that receives data. The shift register includes an input node coupled to the transmit node of each DSP and an output node coupled to the receive node of each DSP. The input node receives data from the transmit node of each DSP, and the output node communicates the data received at the input node to the receive node of each DSP.

21 Claims, 3 Drawing Sheets

SYSTEM AND METHOD FOR COMMUNICATING DATA AMONG A PLURALITY OF DIGITAL SIGNAL PROCESSORS

TECHNICAL FIELD OF THE INVENTION

This invention relates to the field of data communications and, more particularly, to a system and method for communicating data among a plurality of digital signal processors.

BACKGROUND OF THE INVENTION

Many hardware devices use a pool of digital signal processors (DSPs) to support processing or communication applications. When an application requires more than one DSP, the DSPs must communicate data to one another to support the application. Unfortunately, existing inter-processor communication techniques either require expensive switching devices to govern communications between the DSPs or link the DSPs to one another in an arrangement that limits the functionality or performance of the DSPs.

SUMMARY OF THE INVENTION

From the foregoing, a need has arisen for a system and method for communicating data among digital signal processors (DSPs) that does not require an expensive switching device, limit the DSPs' functionality, or degrade the DSPs' performance. In accordance with the present invention, a system and method for communicating data among a plurality of DSPs is provided that substantially eliminates or reduces disadvantages or problems associated with previously developed systems and methods.

In one embodiment, a system for communicating data among digital signal processors (DSPs) includes DSPs and a shift register. Each DSP includes a transmit node that communicates data and a receive node that receives data. The shift register includes an input node coupled to the transmit node of each DSP and an output node coupled to the receive node of each DSP. The input node receives data from the transmit node of each DSP, and the output node communicates the data received at the input node to the receive node of each DSP.

In another embodiment, a system for communicating data among a plurality of DSPs includes DSPs and shift registers. Each DSP includes a transmit node that communicates data and a receive node that receives data. Each shift register, associated with a subset of the DSPs, receives data from a first DSP and communicates the data to a second DSP in the associated subset.

Technical advantages of the present invention include a system and method for communicating data among DSPs. By using a shift register to communicate data among the DSPs, a hardware device may avoid more expensive inter-processor communication solutions, such as a time division multiplexing switch. In addition, the shift register allows the DSPs to communicate data directly to one another without introducing significant propagation delays, and thus, improves the throughput (or rate of communication) of the inter-processor communication link. For these and other readily apparent reasons, the present invention represents a significance advance over prior systems and methods.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE DRAWINGS

Figure 1:
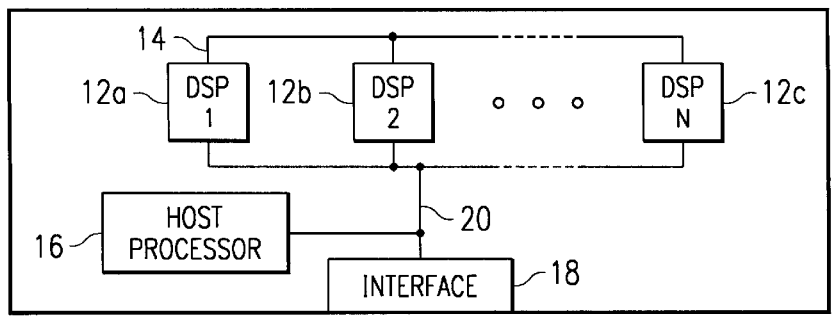
FIG. 1 illustrates a device including DSPs that communicate data to one another using an inter-processor communication link.

FIG. 1 illustrates a device 10 including DSPs 12a, 12b, and 12c (collectively, DSPs 12) that communicate data to one another using an inter-processor communication link 14. In addition to DSPs 12, device 10 includes a host processor 16 and an interface 18. A host processor interface (HPI) bus 20 couples host processor 16 and interface 18 to DSPs 12. HPI bus 20 may be a shared or dedicated communication path that supports serial, parallel, or any other suitable form of communication. Generally, host processor 16 receives input data packets from interface 18 and communicates the input data packets to DSPs 12 using HPI bus 20. DSPs 12 receive the input data packets, process the input data packets to generate output data packets, and communicate the output data packets to interface 18 using HPI bus 20. In some processing or communication applications, two or more DSPs 12 may process the input data packets to generate the output data packets. In such applications, DSPs 12 communicate intermediate information to one another to generate the output data packets. To avoid burdening HPI bus 20 with further data traffic and interfering with communications to and from host processor 16 and interface 18, DSPs 12 may communicate the intermediate information to one another using inter-processor communication link 14. Thus, if inter-processor communication link 14 can efficiently communicate data from one DSP 12 to another without substantial propagation delay, inter-processor communication link 14 may improve the overall performance of the communication or processing applications supported by device 10.

In a particular embodiment, device 10 is a circuit board that supports voice conferencing over a data network. Conference participants use end-user devices, such as telephones, computers, or other suitable conferencing equipment, to communicate and receive data streams including voice information. The end-user devices communicate data streams to device 10 and receive data streams from device 10 using a local-area network (LAN), a wide-area network (WAN), the Internet, and any other suitable packet-based network. The data network may communicate data packets to and from conferencing device 10 using an Internet protocol, an Ethernet protocol, an Asynchronous Transfer Mode (ATM) protocol, or any other suitable network protocol. The end user devices may be coupled to the data network by wireless, wireline, or other suitable communication paths and may communicate and receive data packets encapsulating the data streams. Alternatively, gateway devices may link the end-user devices to the data network and translate between the communication protocols used by the end user devices and the network protocols used by the data network.

In such an embodiment, DSPs 12 receive data packets from interface 18, process the data packets to reconstruct input data streams generated by the end-user devices, mix the input data streams to generate output data streams, encapsulate the output data streams into data packets, and communicate the output data packets to the end-user devices or gateway devices using interface 18. If two or more DSPs 12 process the input data packets to generate the output data packets, DSPs 12 may communicate intermediate information to one another. For example, a first DSP 12*a* may receive the input data packets from interface 18 and decode, or linearize, the data included in the data packets to generate input voice date streams. For example, the input data packets may include voice information encoded according to G.711, G.723, G.729, or other suitable coding format. First DSP 12*a* may then communicate the decoded, or linearized, input voice data streams to a second DSP 12*b* using interprocessor communication link 14. Second DSP 12*b* may mix the input voice data streams associated with two or more conference participants to produce output voice data streams and communicate the output voice data streams to a third DSP 12*c* using interprocessor communication link 14. Third DSP 12*c* may encode the output voices data streams for each conference participant according to a coding format used by the participant's end-user device. Then, third DSP 12*c* may encapsulate the encoded voice data streams into output data packets and communicate the output data packets to the end-user devices or gateway devices using interface 18. Thus, in a particular embodiment of device 10, two or more DSPs 12 may communicate intermediate information to one another to support a voice conferencing application. Although a particular voice conferencing application is described in detail with reference to FIG. 1, device 10 may support a variety of other suitable processing or communication applications using DSPs 12.

Figure 2:
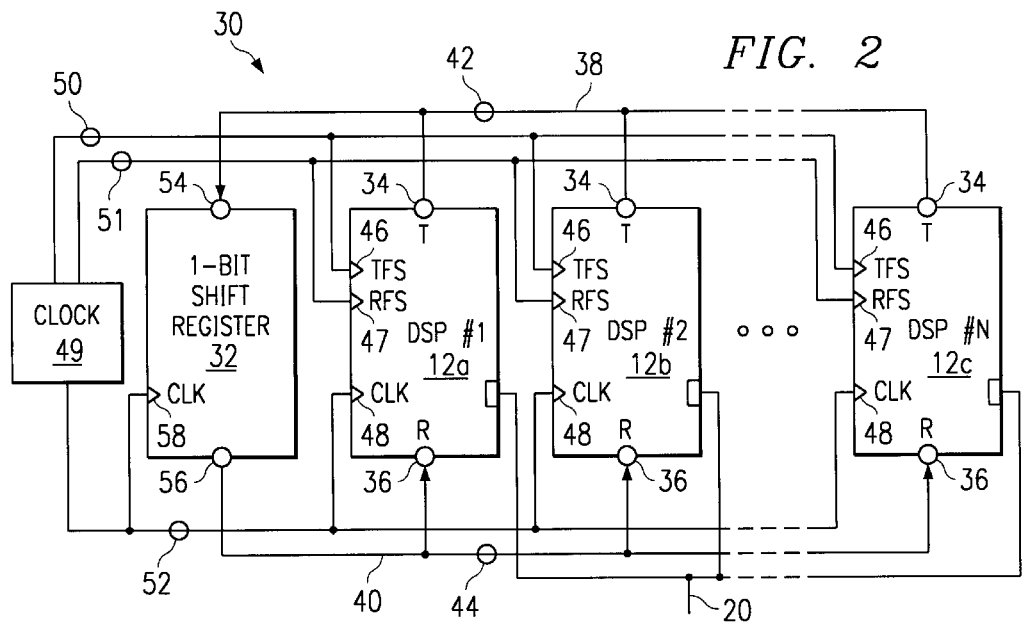
FIG. 2 illustrates a system for communicating data among DSPs using a shift register.

FIG. 2 illustrates a system 30 for communicating data among DSPs 12 using shift register 32. As described in further detail below, shift register 32 receives data from one of DSPs 12 and communicates the data to two or more other DSPs 12. By providing a driving voltage, shift register 32 allows DSP 12 to communicate data to two or more other DSPs 12 without violating the fan-out limitations of DSP 12.

As described above, DSPs 12 may communicate data to one another to support a processing or communication application that utilizes more than one DSP 12. To communicate data to one another, DSPs 12 include transmit nodes 34 and receive nodes 36. Transmit nodes 34 communicate data to shift register 32 using transmit data line 38, and receive nodes 36 receive data from shift register 32 using receive data line 40. Transmit data line 38 and receive data line 40 may support serial, parallel, or any other suitable form of communication.

Shift register 32 receives data from one of DSPs 12 and communicates the data to two or more other DSPs 12. Shift register 32 includes an input node 54, an output node 56, and a clock input 58. Shift register 32 receives clock signal 52 using clock input 58 and detects a clocking event. The clocking event may include a transition from a low voltage to a high voltage (a positive-edge clocking event), a transition from a high voltage to a low voltage (a negative-edge clocking event), or any other detectable state of clock signal 52 or change in the state of clock signal 52. In response to detecting the clocking event, shift register 32 receives data from transmit data line 38 using input node 54 and communicates the data to output data line 40 using output node 56. In a particular embodiment, shift register 32 is a one-bit shift register, and transmit data line 38 and receive data line 40 are serial communication paths.

By providing an interface between transmit nodes 34 and receive nodes 36, shift register 32 provides a driving voltage that can communicate data to DSPs 12 without regard to the fan-out limitations of transmit nodes 34. DSPs 12 use reference voltages to represent logic 1 and logic 0. If receive nodes 36 receive voltages that are near the reference voltages within a tolerance called a noise margin, DSPs 12 recognize the voltages as if they were a perfect logic 1 or 0. Unfortunately, transmit nodes 34 can drive only a finite number of receive nodes 36 before the output signal level becomes so degraded that receive nodes 36 can no longer recognize the signal levels as logic 1's or logic 0's. Shift register 32 may provide a driving voltage that can drive a greater number of receive nodes 36. In addition, as described in further detail below with reference to FIG. 4, system 30 may include more than one shift register 32 to support an even greater number of DSPs 12.

In addition, because shift register 32 does not create a substantial propagation delay between transmit nodes 34 and receive nodes 36, shift register 32 improves the throughput of inter-processor communication link 14. Some prior inter-processor communication techniques require a time division multiplexing (TDM) switch to execute time slot switching among DSPs. Unfortunately, a TDM switch typically restricts the maximum data rate of an inter-processor communication link. In contrast, shift register 32 allows inter-processor link 14 to operate at the maximum speed supported by DSPs 12. Thus, DSPs 12, as opposed to shift register 32, sets the upper limit of the data rate. Another prior inter-processor communication technique involves coupling several DSPs together in a daisy chain. Thus, to communicate data from a source DSP to a destination DSP that is not directly coupled to the source DSP, the data must pass through one or more intermediate DSPs in the daisy chain. Because each intermediary DSP adds to the propagation delay, this inter-processor communication technique often results in a low throughput. In contrast, in system 30, any DSP 12 may communicate data to any other DSP 12 without using intermediary DSPs 12. For these reasons, system 30 reduces propagation delay and improves the throughput of inter-processor communication link 14.

In a particular embodiment, DSPs 12 communicate and receive data using time division multiplexing (TDM). By dividing a transmit channel 42 into time slots, TDM allows more than one DSP 12 to communicate data over transmit data line 38. Similarly, by dividing a receive channel 44 into time slots, TDM allows more than one DSP 12 to receive data from receive data line 40. To implement TDM, a clock 49 generates a transmit frame synchronization (TFS) signal 50, a receive frame synchronization (RFS) signal 51, and a clock signal 52 to serve as timing references in system 30. In a particular embodiment, clock 49 uses an oscillator to generate clock signal 52 and derives TFS signal 50 and RFS signal 51 from clock signal 52. DSPs 12 receive TFS signal 50 using TFS inputs 46, RFS signal 51 using RFS inputs 47, and clock signal 52 using clock inputs 48. In an alternative embodiment, clock 49 communicates TFS signal 50 and clock signal 50 to DSPs 12, and DSPs 12 derive RFS signal 51 from TFS signal 50 and clock signal 52.

Using clock signal 52, DSPs 12 divide transmit channel 42 and receive channel 44 into time slots. DSPs 12 receive clock signal 52 and detect a clocking event using clock signal 52. As described above, a clocking event may include a transition from a low voltage to a high voltage (a positive-edge clocking event), a transition from a high voltage to a low voltage (a negative-edge clocking event), or any other detectable state of clock signal 52 or change in the state of clock signal 52. Each clocking event indicates the beginning of a time slot. By detecting the clocking events, DSPs 12 identify the beginning of each time slot in transmit channel 42 and receive channel 44.

Using TFS signal 50, DSPs 12 distinguish between the time slots in transmit channel 42. DSPs 12 receive TFS signal 50 and detect a triggering event using TFS signal 50. Like a clocking event, a triggering event may include a transition from a low voltage to a high voltage (a positive-edge triggering event), a transition from a high voltage to a low voltage (a negative-edge triggering event), or any other detectable state of TFS signal 50 or change in the state of TFS signal 50. Each triggering event indicates the beginning of a series of time slots in transmit channel 42. By detecting a triggering event, DSPs 12 identify the beginning of a series of time slots and, using clock signal 52, identify each time slot in the series with reference to the triggering event.

Using RFS signal 51, DSPs 12 distinguish between the time slots in receive channel 44. DSPs 12 receive RFS signal 51 and detect a triggering event using RFS signal 51. Similar to TFS signal 50, each triggering event in RFS signal 51 indicates the beginning of a series of time slots in receive channel 44. By detecting a triggering event, DSPs 12 identify the beginning of a series of time slots and, using clock signal 52, identify each time slot in the series with reference to the triggering event.

DSPs 12 use specified time slots to communicate data in transmit channel 42 and receive data from receive channel 44. Host processor 16 may assign DSPs 12 time slots by communicating control information to DSPs 12 using HPI bus 20. For example, to communicate data from DSP 12a to DSP 12b, host processor 16 communicates to DSP 12a control information specifying a time slot in transmit channel 42, and host processor 16 communicates to DSP 12b control information specifying a corresponding time slot in receive channel 44. Using TFS signal 50 and clock signal 52, DSP 12a identifies the specified time slot in transmit channel 42 and communicates the data in the time slot using transmit node 34. Using RFS signal 51 and clock signal 52, DSP 12b identifies the corresponding time slot in receive channel 44 and receives the data from the time slot using receive node 36. The time slot assignments may be static or dynamic according to particular needs. In a particular embodiment, host processor 16 uses TDM to reserve a bandwidth in transmit channel 42 or receive channel 44 for each DSP 12.

Figure 3:
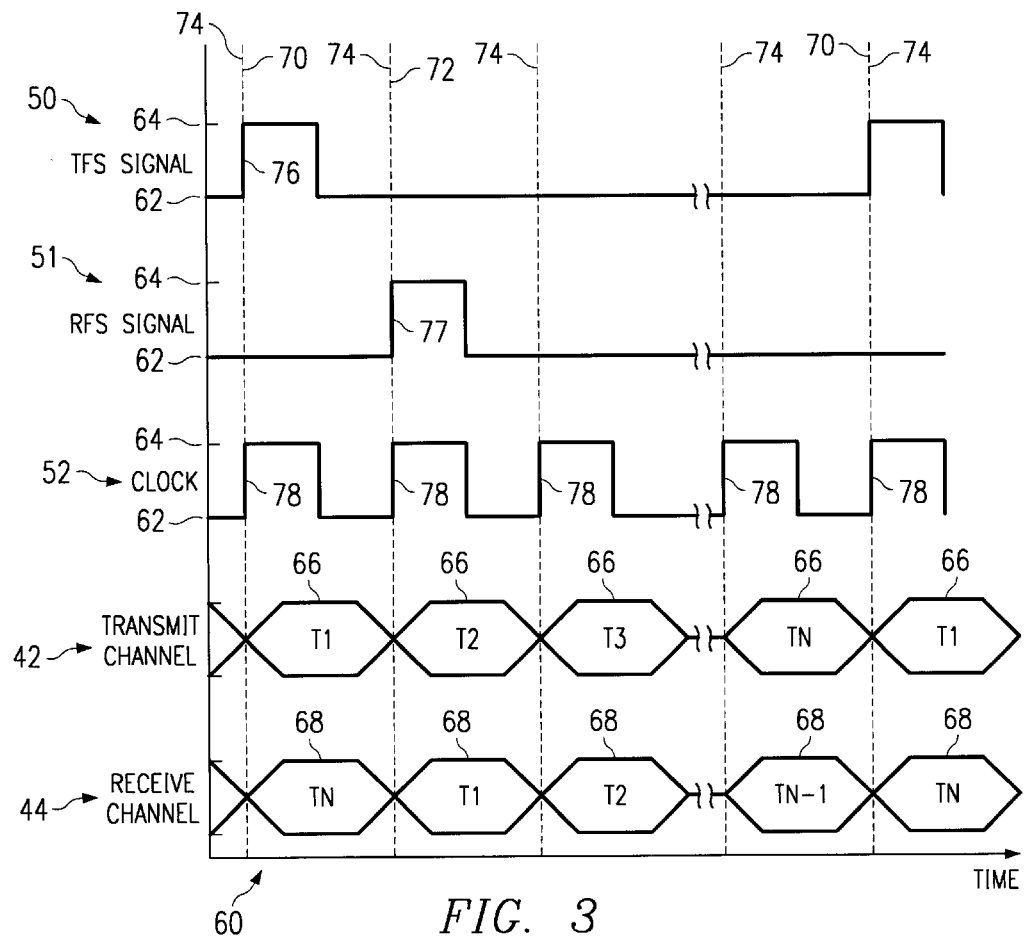
FIG. 3 is a timing diagram demonstrating a method of dividing an inter-processor communication link into a plurality of time periods using a frame synchronization signal and a clock signal.

FIG. 3 is a timing diagram 60 further demonstrating a method of dividing transmit channel 42 and receive channel 44 into time slots 66 and 68, respectively. Timing diagram 60 plots TFS signal 50, RFS signal 51, clock signal 52, transmit channel 42, and receive channel 44 over time. For purposes of illustration in timing diagram 60, TFS signal 50, RFS signal 51, and clock signal 52 are square waves transitioning between a low voltage 62 and a high voltage 64. In alternative embodiments, TFS signal 50, RFS signal 51, and clock signal 52 may be triangle waves, sine waves, or any other signals that include one or more triggering events as described below. Although FIG. 3 demonstrates the use of positive-edge, clocking and triggering events for purposes of illustration, system 30 may use positive-edge (low-to-high transitions), negative-edge (high-to-low transitions), or any other suitable clocking and triggering events.

By transitioning from low voltage 62 to high voltage 64, clock signal 52 indicates the beginning of each time slot 66 in transmit channel 42 and each time slot 68 in receive channel 44. As shown in timing diagram 60, each positive edge 78 of clock signal 52 corresponds to each beginning 74 of time slots 66 and 68.

By transitioning from low voltage 62 to high voltage 64, TFS signal 50 indicates beginning 70 of a series of time slots 66 in transmit channel 42. A positive edge 76 of TFS signal 50 corresponds to beginning 70 of a series of time slots 66, and each time slot 66 in the series is identified with reference to positive edge 76. In the illustrated embodiment, each time slot 66 is sequentially numbered from positive edge 76.

By transitioning from low voltage 62 to high voltage 64, RFS signal 51 indicates beginning 72 of a series of time slots 68 in receive channel 44. A positive edge 77 of RFS signal 51 corresponds to beginning 72 of a series of time slots 68, and each time slot 68 in the series is identified with reference to positive edge 77. In the illustrated embodiment, each time slot 68 is sequentially numbered from positive edge 76. Although TDM is described in detail with reference to FIGS. 2 and 3, DSPs 12 may communicate and receive data according to a variety of other suitable communication protocols.

Figure 4:
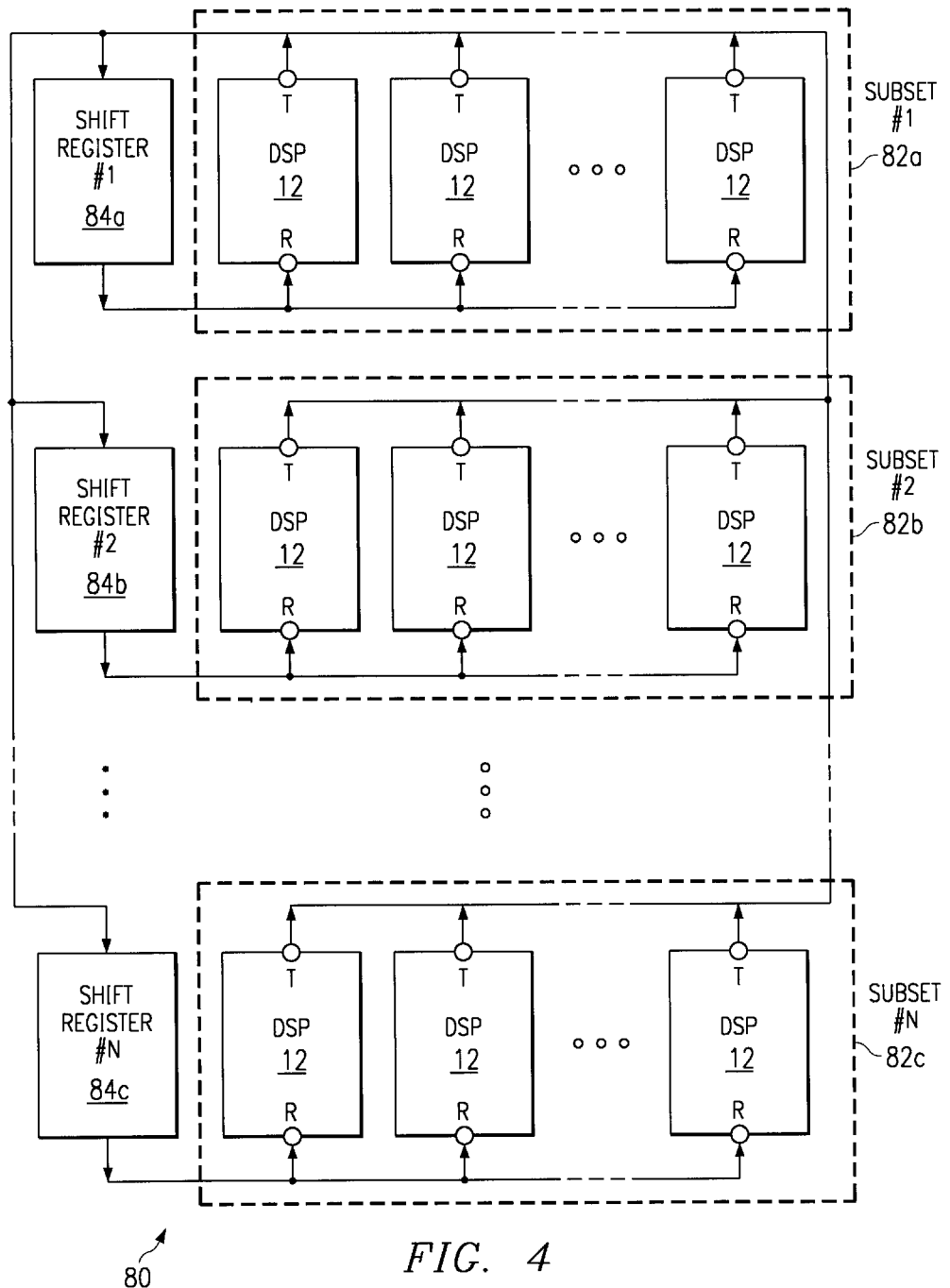
FIG. 4 illustrates a system for communicating data among two or more subsets of DSPs using two or more shift registers.

FIG. 4 illustrates a system 80 for communicating data among two or more subsets 82a, 82b, and 82c (collectively subsets 82) of DSPs 12 using two or more shift registers 84a, 84b, and 84c (collectively, shift registers 84). Because each shift register 84 may drive only a limited number of DSPs 12, system 80 divides DSPs 12 into subsets 82, and each shift register 84 is associated with one of subsets 82 and drives only DSPs 12 in associated subset 82. While each shift register 84 may receive data from any DSP 12, each shift register 84 may communicate data to only DSPs 12 in associated subset 82. As a result, each shift register 84 does not have to drive all DSPs 12 in system 80. System 80 may include any number of shift registers 84 and subsets 82 according to particular needs. In a particular embodiment, the fan-out of DSPs 12 limit the number of shift registers 84 in system 80, and the fan-out of each shift register 84 limits the number of DSPs 12 in each subset 82. In such an embodiment, the maximum number of DSPs 12 is system 30 is the fan-out of DSPs 12 multiplied by the fan-out of shift registers 84. System 80 may communicate data using TDM as described above with reference to FIGS. 2 and 3.

Figure 5:
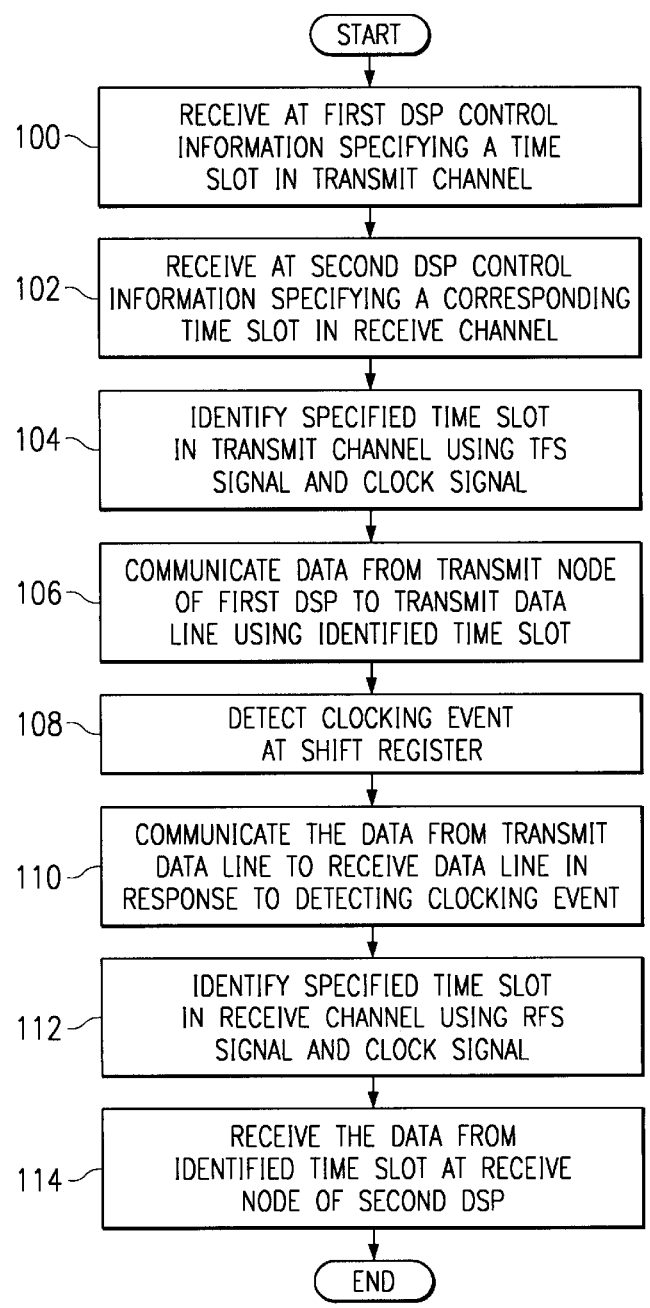
FIG. 5 is a flow chart illustrating a method of communicating data from a first DSP to a second DSP using a shift register.

FIG. 5 is a flow chart demonstrating a method of communicating data from first DSP 12a to second DSP 12b using shift register 32. The method begins at step 100, where first DSP 12a receives control information specifying a time slot 66 in transmit channel 42. Second DSP 12b receives control information specifying a corresponding time slot 68 in receive channel 44 at step 102. First DSP 12a identifies specified time slot 66 using TFS signal 50 and clock signal 52 at step 104 and communicates data from transmit node 34 to transmit data line 38 using identified time slot 66 at step 106. Shift register 32 detects a clocking event at step 108 and, in response, communicates the data from transmit data line 38 to receive data line 40 at step 110. Second DSP 12b identifies specified time slot 68 in receive channel 44 using RFS signal 51 and clock signal 52 at step 112 and receives the data from identified time slot 68 at receive node 36 at step 114, and the method ends.

Although an embodiment of the invention and its advantages are described in detail, a person skilled in the art could make various alterations, additions, and omissions without departing from the spirit and scope of the present invention as defined by the appended claims.

What is claimed is:

1. A system for communicating data among a plurality of digital signal processors, the system comprising:

a first set of digital signal processors (DSPs), each DSP comprising:
    a transmit node operable to communicate data; and
    a receive node operable to receive data;
a second set of digital signal processors (DSPs), each DSP comprising:
    a transmit node operable to communicate data; and
    a receive node operable to receive data;
a first register operable to receive data from the first set of DSPs and from the second set of DSPs and operable to communicate data to the first set of DSPs and not operable to communicate data to the second set of DSPs; and
a second register operable to receive data from the first set of DSPs and from the second set of DSPs and operable to communicate data to the second set of DSPs and not operable to communicate data to the first set of DSPs.

2. The system of claim 1, wherein each register receives the data from the first DSP and communicates the data to the second DSP in response to detecting a clocking event.

3. The system of claim 1, wherein each register comprises:
    an input node coupled to the transmit node of each DSP and operable to receive data from the transmit node of each DSP; and
    an output node coupled to the receive node of each DSP in the associated subset and operable to communicate the data received at the input node to the receive node of each DSP in the associated subset.

4. The system of claim 1, wherein each DSP receives and transmits data according a time-division multiplexing protocol.

5. The system of claim 1, wherein each DSP further comprises:
    a frame synchronization input operable to receive a frame synchronization signal that indicates a beginning of a series of time slots; and
    a clock input operable to receive a clock signal that indicates a beginning of each time slot; and
    wherein each DSP is further operable to identify a time slot using the frame synchronization and the clock signal.

6. The system of claim 1, wherein the first DSP is operable to receive input data packets associated with a media conference, to generate media information by decoding the input data packets, and to communicate the media information to the second DSP using a shift register associated with the second DSP.

7. The system of claim 1, wherein the second DSP is operable to receive media information using a shift register associated with the second DSP and to process the media information to generate output data packets associated with a media conference.

8. The system of claim 1, wherein:
    each register comprises a one-bit shift register;
    the transmit node of each DSP couples to the input node of each one-bit shift register by a serial transmit data line; and
    the output node of each one-bit shift register couples to the receive data line of each DSP in the associated subset by a serial receive data line.

9. A method of communicating data among a plurality of digital signal processors, the method comprising:
    receiving a first set of data at a first register from a first set of digital signal processors (DSPs) and a second set of digital signal processors;
    storing the first set of data in the first register;
    communicating the first set of data from the first register to only the first set of DPSs;
    receiving a second set of data at a second register from the first set of DSPs and the second set of DSPs;
    storing the second set of data in the second register; and
    communicating the second set of data from the second register to only the second set of DPSs.

10. The method of claim 9, wherein communicating the first set of data comprises communicating the first set of data in response to a first clocking event and wherein communicating the second set of data comprises communicating the second set of data in response to a second clocking event.

11. The method of claim 9, wherein:
    receiving the first set of data rises receiving the first set of data according to a time-division multiplexing protocol,
    communicating the first set of data comprises communicating the first set of data according to a time-division multiplexing protocol,
    receiving the second set of data comprises receiving the second set of data according to a time-division multiplexing protocol; and
    communicating the second set of data comprises communicating the second set of data according to a time-division multiplexing protocol.

12. The method of claim 9, further comprising:
    receiving a frame synchronization signal that indicates a beginning of a series of time slots; and
    receiving a clock signal that indicates a beginning of each time slot; and
    identifying a time slot using the frame synchronization and the clock signal.

13. The method of claim 9, further comprising wherein the first set of data comprises input data packets associated with a media conference and further comprising:
    generating media information by decoding the input data packets, and
    communicating the media information to the second DSP using a shift register associated with the second DSP.

14. The method of claim 9, wherein:
    storing the first set of data in the first register comprises storing the first set of data in a one-bit shift register; and
    communicating the first set of data comprises transmitting the first set of data to an input node of each DSP in the first set of DSPs by a serial receive data line.

15. Logic to communicate data between a plurality of DSPs, the logic embodied in memory and operable to perform the steps of:
    receiving a first set of data at a first register from a first set of digital signal processors (DSPs) and a second set of digital signal processors;
    storing the first set of data in the first register;
    communicating the first set of data from the first register to only the first set of DPSs;
    receiving a second set of data at a second register from the first set of DSPs and the second set of DSPs;
    storing the second set of data in the second register; and
    communicating the second set of data from the second register to only the second set of DPSs.

16. The logic of claim 15, wherein communicating the first set of data comprises communicating the first set of data in response to a first clocking event and wherein communicating the second set of data comprises communicating the second set of data in response to a second clocking event.

17. The logic of claim 15, wherein:
receiving the first set of data comprises receiving the first set of data according to a time-division multiplexing protocol,
communicating the first set of data comprises communicating the first set of data according to a time-division multiplexing protocol,
receiving the second set of data comprises receiving the second set of data according to a time-division multiplexing protocol; and
communicating the second set of data comprises communicating the second set of data according to a time-division multiplexing protocol.

18. The logic of claim 15, further operable to perform the steps of:
receiving a frame synchronization signal that indicates a beginning of a series of time slots; and
receiving a clock signal that indicates a beginning of each time slot; and
identifying a time slot using the frame synchronization and the clock signal.

19. The logic of claim 15, wherein the first set of data comprises input data packets associated with a media conference and wherein the logic is further operable to perform the steps of:
generating media information by decoding the input data packets, and
communicating the media information to the second DSP using a shift register associated with the second DSP.

20. The logic of claim 15, wherein:
storing the first set of data in the first register comprises storing the first set of data in a one-bit shift register; and
communicating the first set of data comprises transmitting the first set of data to an input node of each DSP in the first set of DSPs by a serial receive data line.

21. A system for communicating data between a plurality of DSPs, comprising:
means receiving a first set of data at a first register from a first set of digital signal processors (DSPs) and a second set of digital signal processors;
means for storing the first set of data in the first register;
means for communicating the first set of data from the first register to only the first set of DPSs;
means for receiving a second set of data at a second register from the first set of DSPs and the second set of DSPs; and
means for storing the second set of data in the second register; and communicating the second set of data from the second register to only the second set of DPSs.

* * * * *

UNITED STATES PATENT AND TRADEMARK OFFICE
CERTIFICATE OF CORRECTION

PATENT NO. : 6,650,696 B1
DATED : November 18, 2003
INVENTOR(S) : Tien-Yi Lin et al.

It is certified that error appears in the above-identified patent and that said Letters Patent is hereby corrected as shown below:

Column 7,
Line 31, after "according" insert -- to --.

Column 8,
Lines 3, 8, 55 and 60, after "of" delete "DPSs" insert -- DSPs --.
Line 15, after "data" delete "rises" insert -- comprises --.

Column 10,
Lines 18 and 24, after "of" delete "DPSs" insert -- DSPs --.
Line 23, after "register" delete ";".

Signed and Sealed this

Sixth Day of July, 2004

JON W. DUDAS
*Acting Director of the United States Patent and Trademark Office*